United States Patent
Nsouli

(10) Patent No.: US 11,431,748 B2
(45) Date of Patent: Aug. 30, 2022

(54) PREDICTIVE CROWDSOURCING-BASED ENDPOINT PROTECTION SYSTEM

(71) Applicant: Mounir Talal Nsouli, Potomac, MD (US)

(72) Inventor: Mounir Talal Nsouli, Potomac, MD (US)

(*) Notice: Subject to any disclaimer, the term of this patent is extended or adjusted under 35 U.S.C. 154(b) by 392 days.

(21) Appl. No.: 16/227,485

(22) Filed: Dec. 20, 2018

(65) Prior Publication Data

US 2019/0190947 A1    Jun. 20, 2019

Related U.S. Application Data

(60) Provisional application No. 62/608,174, filed on Dec. 20, 2017.

(51) Int. Cl.

| | |
|---|---|
| *H04L 9/40* | (2022.01) |
| *G06F 21/55* | (2013.01) |
| *G06N 5/02* | (2006.01) |
| *G06N 5/04* | (2006.01) |
| *G06N 20/00* | (2019.01) |
| *G06F 9/451* | (2018.01) |
| *G06F 8/61* | (2018.01) |
| *G06F 11/34* | (2006.01) |

(52) U.S. Cl.
CPC ............ *H04L 63/1441* (2013.01); *G06F 8/61* (2013.01); *G06F 9/451* (2018.02); *G06F 11/34* (2013.01); *G06F 21/552* (2013.01); *G06N 5/025* (2013.01); *G06N 5/04* (2013.01); *G06N 20/00* (2019.01); *H04L 63/101* (2013.01); *H04L 63/105* (2013.01); *H04L 63/1425* (2013.01); *H04L 63/1433* (2013.01); *H04L 63/20* (2013.01); *G06F 2221/034* (2013.01)

(58) Field of Classification Search
CPC . H04L 63/1441; H04L 63/101; H04L 63/105; H04L 63/1425; H04L 63/1433; H04L 63/20; G06F 9/451; G06F 8/61; G06F 11/34; G06F 21/552; G06F 2221/034; G06F 17/40; G06N 20/00; G06N 5/025; G06N 5/04; G06N 3/08; G06N 5/022
See application file for complete search history.

(56) References Cited

U.S. PATENT DOCUMENTS 8,584,242 B2    11/2013  Lagar-Cavilla et al.
8,990,234 B1 *   3/2015  Myslinski ............ G06F 40/289
                                                     707/758

(Continued)

*Primary Examiner* — Trang T Doan
(74) *Attorney, Agent, or Firm* — Maier & Maier, PLLC

(57) ABSTRACT

A three-component computer security system focused around crowdsourcing. Users may install the software, at which point it may access the users' computers or hosts, identify certain behaviors as suspicious, and ask for confirmation from the user. The user may then manually edit the report to remove or add behaviors. The system may then prepare a report to deliver to a central system, which may perform malware detection, expert evaluation, and deep learning on the received reports. When the host program's assessment and the user's assessment conflict, the program may be flagged for expert analysis. This use of crowdsourced information may then be used to develop detection, mitigation, and prediction protocols, which may be based on machine learning, and may further be used to manage hackbacks if authorized and desired.

15 Claims, 5 Drawing Sheets

(56) References Cited

U.S. PATENT DOCUMENTS

| | | | |
|---|---|---|---|
| 9,009,827 B1* | 4/2015 | Albertson | H04L 63/14 |
| | | | 726/22 |
| 9,015,843 B2 | 4/2015 | Griffin et al. | |
| 9,043,922 B1 | 5/2015 | Dumitras et al. | |
| 9,519,775 B2 | 12/2016 | Sridhara et al. | |
| 9,767,285 B2 | 9/2017 | Mulchandani | |
| 10,516,695 B1* | 12/2019 | Evans | H04L 63/1425 |
| 2008/0066179 A1* | 3/2008 | Liu | G06F 21/562 |
| | | | 726/24 |
| 2013/0254880 A1* | 9/2013 | Alperovitch | H04L 63/1408 |
| | | | 726/22 |
| 2014/0007238 A1 | 1/2014 | Magee et al. | |
| 2014/0259170 A1 | 9/2014 | Amsler | |
| 2015/0381637 A1* | 12/2015 | Raff | H04L 63/0218 |
| | | | 726/23 |
| 2016/0255115 A1 | 9/2016 | Mital et al. | |
| 2018/0247045 A1* | 8/2018 | David | G06F 21/121 |

\* cited by examiner

PREDICTIVE CROWDSOURCING-BASED ENDPOINT PROTECTION SYSTEM

BACKGROUND

The roots of the computer virus can be traced at least back to 1949, when John von Neumann theorized the concept of self-replicating computer programs. Specifically, Von Neumann had invented the concept of a cellular automaton, a grid-based cell structure having many possible different cell states, well as a pattern of cell states within the cellular automaton that, when run, would replicate itself in the design. (This work was published posthumously in 1966, in "Theory of Self-Reproducing Automata," a collection of his academic works. The concept of a cellular automaton was later popularized by John Horton Conway's "Game of Life," a two-dimensional cellular automaton published in the 1970s.)

The first known computer virus, the Creeper virus, appeared in 1971. It was designed to infect Digital Equipment Corporation's PDP-10 mainframe running its proprietary TENEX operating system. Creeper was eventually defeated by Reaper, a program created by Ray Tomlinson, considered to be the first anti-virus (AV) software ever created. Nonetheless, Reaper was itself a virus expressly instructed to locate and terminate Creeper.

Current techniques of malware analysis and detection are becoming increasingly challenged by the evolution and sophistication of attacks. Most modern computer users depend on antivirus software to protect their systems from attack. However, despite the numerous AV programs and their respective vendors, current intrusion detection and prevention systems (IDPS) do not effectively protect users.

To date, three IDPS detection techniques have been theorized: signature-based detection, anomaly-based detection (or behavior-based detection), and stateful protocol detection. Only the first two have seen widespread implementation.

Signature-Based Detection (SBD) is the most common technique. SBD allows for the detection and prevention of attacks by looking for specific patterns, such as, for example, specific byte patterns in network traffic, or known malicious instruction sequences that may be used by known malware. The terminology of "signature-based" detection comes from antivirus software, which characterizes these detected patterns as being "threat signatures."

While SBD is effective at identifying malware that have the specific identified threat signatures, it has certain notable shortcomings. First, it can only identify viruses from known datasets and experiences difficulties with viruses using obfuscation or polymorphism techniques. Second, in order to determine whether a particular program contains code matching a threat signature in a known dataset, the source code of the program must be uncovered and analyzed, which is a complex process at best and is often completely impossible in the event that the virus or malware program is obfuscated or packed.

Anomaly-Based Detection (ABD) is a less common technique that has been seeing increasing use. ABD techniques were introduced in order to try to detect unknown attacks, based on the rapid development of malware and the possibility of malware making use of dynamic obfuscation or polymorphism techniques. ABD essentially makes use of machine learning to create a model of trustworthy activity, so that new behavior can be compared against this model in order to determine the likelihood of the new behavior being trustworthy or untrustworthy activity. This allows ABD to be used to detect unknown viruses and new variants of existing viruses. Although it requires more overhead and processing capacity over SBD, and has certain downsides, it refrains from having to process an immense amount of virus samples and can adapt over time by using machine learning algorithms.

One of ABD's most major shortcomings, however, is that it has both a higher false positive rate and a higher false negative rate than SBD. A false-positive detection will occur when previously unknown legitimate activity, or a benign application, is categorized as malicious. For example, Mozc, an open-sourced Japanese input method editor, is often mistakenly identified as a virus due to its hook function, which is fundamentally similar to many keylogger threats. (Generally, however, false positives can be corrected relatively easily by asking for user confirmation.) On the other hand, false-negative detection occurs as result of a failure to recognize truly malicious code acting in a benign manner, i.e. malicious adware programs integrated into free downloadable software. In such cases, it is the end-users, instead of AV systems, that might finally identify the infection due to abnormal computer performance, i.e. cooling fans running at full speed without reason, high RAM usage, and high network traffic.

Certain efforts have been made to try to correct the shortcomings of each of the above systems. In particular, several articles have laid out methods for analyzing malware samples and extracting significant operant behavior, which may permit the pouring of a foundation for building knowledge bases that can be used to more carefully screen for false negatives and false positives. However, these methods lack content regarding method diversity and dataset analysis and punctuality, due to the fact that these knowledge bases must be constructed and educated, with accurate information from trusted sources (as it would obviously be undesirable if, for example, the creator of a botnet program was able to get that botnet program whitelisted in the appropriate knowledge base).

SUMMARY

An antimalware architecture may be disclosed which may provide a new, evolutionary multi-pronged solution for addressing today's multi-headed malware attacks. Such an architecture may be embodied in a predictive crowdsourcing-based endpoint protection system, embodiments of which may be disclosed herein.

According to an exemplary embodiment, an antimalware architecture may be configured to make use of crowdsourcing and expert evaluation to build an anti-malware database in a manner that significantly improves the current standards for updating malware definitions. In some exemplary embodiments, such an architecture may make use of numerical weather prediction models as applied to a computing environment, or may incorporate software behavior computation, in order to provide a sophisticated detection system. In other exemplary embodiments, a system may be configured to provide not only sophisticated detection of malware and other attacks, but prediction of malware and other attacks before they happen.

It may be noted that one major disadvantage held by past antimalware architectures is that such architectures are designed to have their systems operate reactively. An antivirus program may be configured to monitor a user's incoming and outgoing network traffic and installed programs, but may do no more beyond that; the antimalware architecture may be concerned exclusively with what is happening on the user's machine, and take no proactive action to prevent infection (other than closing obvious security holes on the user's machine such as open ports). As such, in still other exemplary embodiments, it may be desired to have an antimalware architecture be configured to proactively address threats or cooperate with other systems to proactively address threats. For example, according to an exemplary embodiment, such a system could be weaponized to go on the offensive by hunting down malware rather than being on the receiving end of attack, and optionally may be combined with machine and deep learning elements in order to facilitate this.

According to an exemplary embodiment, a system for malware prediction and suppression may be provided, which may make use of a crowdsourcing system. For example, the system may be provided across a plurality of host computers, each with a host antimalware service configured to collect log data, and further with a manual reporting interface provided by the antimalware service. These host computers may all report to a server having a report database and a knowledge base. The server may perform the steps of: receiving, from the plurality of host computers, log data and manual submission data relating to a program (which may be provided, for example, in the form of a report); classifying, based on the log data and manual submission data, the program; identifying whether the program is new (i.e. not included in the knowledge base already), and, when the program is new, format the program for inclusion into the knowledge base; identifying an application behavior, and performing a numerical malware prediction based on the application behavior, wherein the numerical malware prediction comprises retrieving malware atmosphere data, retrieving attack pattern data, and generating the numerical malware prediction based on the application behavior, the malware atmosphere data, and the attack pattern data; identifying at least one countermeasure from a list of acceptable countermeasures based on the numerical malware prediction (such as, for example, implementing a hackback attempt); and implementing the at least one countermeasure.

In an exemplary embodiment, the system may be configured to implement the countermeasure such that it involves identifying, from the log data and manual submission data, a source of the application (such as a point of origin online, a program installation file that also included the application, and so forth); performing an attack attribution on the source of the application; and automatically generating and sending one or more communications to the source of the application. This may include, for example, identifying a registered owner of the source of the application; and generating and sending a message to the registered owner of the source of the application. This may also include, for example, identifying, with a whitelist, an absence of the source of the application on a whitelist (such as a "hospitals" whitelist); and, with the plurality of host computers, executing a Direct Denial of Service (DDoS) attack on the source of the application. Other hackback efforts may also be contemplated.

In an exemplary embodiment, the step of receiving, from the plurality of host computers, log data and manual submission data relating to a program may include the steps of: accessing, with the host antimalware service, the host computer, and determining one or more instances of probable suspicious behavior; generating a confirmation message indicating the suspicious behavior, displaying the confirmation message via the manual reporting interface, and receiving a confirmation from a user via the manual reporting interface; and generating and sending a report to the server comprising log data of the suspicious behavior.

In an exemplary embodiment, the step of classifying the program may include identifying a plurality of reports received from the host computers, each of the reports comprising at least one of log data and manual submission data; identifying a conflict in the plurality of reports; and flagging the program for expert evaluation based on the conflict. An expert evaluation may be used as a "tiebreaker" in such circumstances, and may include receiving an expert evaluation indicating the program as malicious or non-malicious, and uploading the expert evaluation to the knowledge base; identifying one or more reports in the plurality of reports contradicting the expert evaluation, and identifying a source of the one or more reports; and flagging the source of the one or more reports. If a source is flagged multiple times, it may be marked as untrusted.

In an exemplary embodiment, the server may include a deep learning element, which may be trained with a list of known virus samples and known benign files, such that the server is configured to automatically generate at least one rule based on the list of known virus samples and known benign files; and automatically update the at least one rule based on the log data and manual submission data.

In an exemplary embodiment, data sent from the user system may also include the program itself, which may be included for further evaluation. The server may include a server antimalware service configured to scan the log data and manual submission data in order to ensure that the server is not infected based on, for example, an old definitions file or old version of the program being used.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

According to an exemplary embodiment, and referring generally to the Figures, various exemplary implementations of an architecture for implementing a predictive crowdsourcing-based endpoint protection system (which may be, in particular, a predictive software behavior computation with crowdsourcing to a deep learning and machine learning anti-malware endpoint protection system) which may be referred to generally as an antimalware system or antimalware architecture, may be disclosed.

Figure 1:
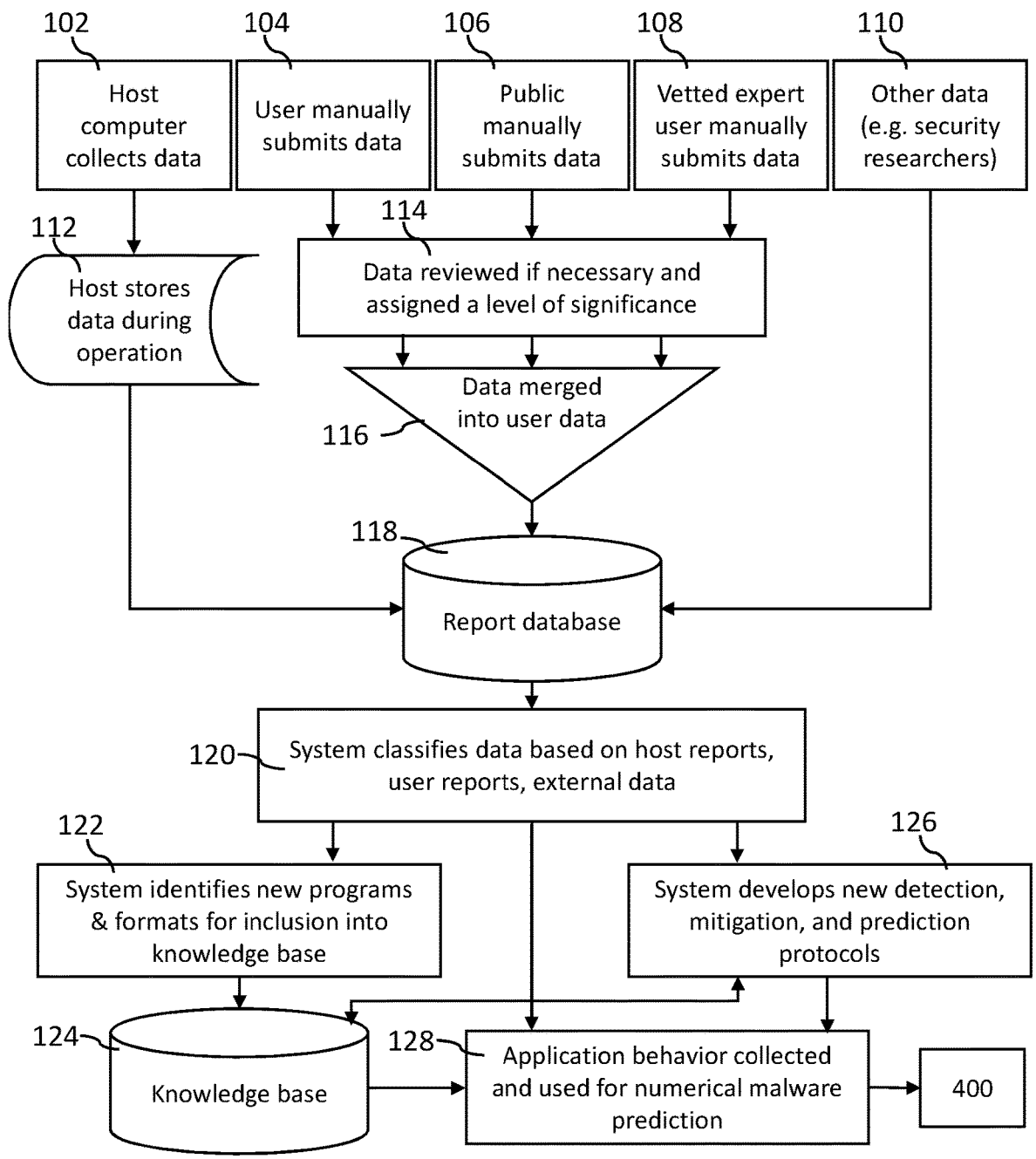
FIG. 1 is an exemplary embodiment of a data collection system for an antimalware system.

Turning now to exemplary FIG. 1, FIG. 1 displays an exemplary embodiment of a data collection system for an antimalware system 100. According to an exemplary embodiment, an antimalware system may collect data from a variety of sources, including from a host computer configured to run an antimalware service 102, data that may be manually submitted by one or more users 104, 106, 108 (including users of the antimalware service 104, members of the public who are not connected with or who are not necessarily connected with the antimalware service 106, or experts or users/members of the public who are regarded as having a higher level of expertise 108), and data that may be collected from other sources 110, such as, for example, data that may be collected and provided to antimalware companies by security researchers.

According to an exemplary embodiment, a host computer configured to run an antimalware service may collect data during its operation 102, and may store said data 112 for submission to a report database 118. According to an exemplary embodiment, data that is collected 102, stored 112, and submitted may include, for example, all log file data from the host computer, or a limited set of log file data from the host computer such as the last 30 or 60 days of logs. Such data may include, for example, one or more statistics on running programs, including, for example, statistics on the resource usage by such programs, or may include, for example, one or more activities of the host computer, such as, for example, scan logs of an associated antivirus or antimalware service.

According to an exemplary embodiment, an initial set of report data may be generated from computer host data 102 in an open-call period. According to an exemplary embodiment, when an antimalware system is in its initial stages, input may be requested from users of the antimalware framework in order to populate a report database 118 with host data. For example, according to an exemplary embodiment, a free trial version of the software may be initially distributed in tandem with an open-call announcement, which may be distributed via an official website as well as via social media networks and IT-related websites. Once users have installed the software, the users may be asked to allow the software to access and fully scan their computers, which may be referred to as hosts, and to set up live two-way communication between their host computer and the report database 118. The software may automatically collect data regarding suspicious behavior 102, may store this data during operation 112, and may in some exemplary embodiments prompt the users to confirm that the behavior is in fact suspicious before submitting the data (or may, for example, collect and submit the data regardless, potentially with addenda that indicate which programs the user had indicated were not suspicious).

Likewise, according to an exemplary embodiment, data may be directly solicited and submitted from the crowd, such as, for example, users of the host program 104, members of the public 106, or vetted experts 108. (In some exemplary embodiments, an expert vetting system may be internal, such that experts are designated internally based on feedback or some other criteria; in other exemplary embodiments, an expert vetting system may make use of other criteria to designate experts, such as, for example, the possession of an advanced degree or level of experience by the expert, such as may be desired.)

According to an exemplary embodiment, data may be first solicited from the crowd during an initial crowdsourcing step in an open-call period. For example, according to an exemplary embodiment, once a user has downloaded a host program, and once the host program has prepared a report showing the programs that it has indicated are most likely to be suspect, the user may be able to manually highlight suspicious application behavior and submit their reports via the program GUI. The user may also be able to highlight application behavior that has been erroneously categorized as being suspicious, such as, for example, benign applications being detected as viruses, benign applications being detected as slowing computer performance, or benign applications engaging in unauthorized access to a website.

According to an exemplary embodiment, when data is received from users of the host program 104, members of the general public 106, community or other experts 108, or host programs 102, it may be assigned a different level of significance based on the point of origin of the report 114. For example, according to an exemplary embodiment, a report prepared by a host program 102 or a community expert 108 may be ranked above a registered user of the host program or an unregistered user of the host program 104, and a user of the host program may in turn have their report 104 be ranked above a member of the public 106 who has no involvement with the program whatsoever. Other arrangements of levels of significance to be assigned to particular reports may also be understood, if desired; for example, it may be that a registered user of the host program may have their report 104 ranked above the report of an unregistered user of the host program, because the registered user of the host program may have assigned a real name and address information to the program during their registration process or may have paid for the program, making it less likely that they would be a malicious actor trying to get a malicious program flagged as benign or vice-versa. Other factors may also be taken into consideration, such that the reports of each individual user rather than each classification of user may have their own unique levels of significance; for example, according to an exemplary embodiment, the past reports of a user (such as the correct/incorrect submission ratio of the reports of that user), the location of the user, the computer hardware and computer OS of the user, user behavior (such as the user's online reputation) and behavior-related data, as well as any other information such as may be desired may be provided. In an exemplary embodiment, users (including members of the general public) may be encouraged to provide reports by an incentive program; for example, according to an exemplary embodiment, a user or member of the general public that submits a certain number of correct reports may receive a free license to the program for a fixed term or for a lifetime term, or may be eligible for promotion to a community expert status.

Once the data from the users has been assigned levels of significance 114, it may then be merged into user data 116 and provided to the report database 118. According to an exemplary embodiment, data to be provided to the report database 118 may include, for example, data compiled by the host computer 102 as well as user data 116; alternatively, one or more sets of user data (such as, for example, user data from vetted experts 108, which may have greater reliability, or conversely user data from anonymous members of the general public who are mass-reporting an apparently malicious program as being benign, which may have less reliability) may be separated from the rest and provided separately. (For example, according to an exemplary embodiment, certain reporting data may even be indicative of a reporting botnet and may be analyzed from that perspective.)

According to an exemplary embodiment, a reporting database may further receive security data from one or more other sources, such as, for example, data from outside security researchers 110. According to an exemplary embodiment, it may generally be anticipated that data from outside researchers 110 or other trusted sources may be provided after the initial findings of a host 102 may be collected and after some user data 116 has been submitted; in such exemplary embodiments, data from the trusted outside sources 110 may be used to correct any errors in the report database 118, and/or determine which of the user reports were "correct" or "incorrect."

Once the system has received a number of reports from hosts 102 and has received a certain amount of user data 116, reports may be aggregated and processed in the report database 118. Once inputs are received, each one may be processed as a data set; a higher number of participating hosts 102 and users 116 may allow for an increased size of dataset to be processed by the system, allowing for a more comprehensive anti-malware knowledge base to be generated.

According to an exemplary embodiment, datasets may then be classified 120. According to an exemplary embodiment, datasets may be classified into multiple subsets, such as, for example, a suspicious subset, a benign subset, and an unclassified subset; other classifications (such as an "unclassified, leaning benign" or "unclassified, leaning suspicious" classification) may be understood as well. Alternatively, datasets may be classified on a scale, for example a scale of 1 to 10, with 1 being benign, 10 being suspicious, and 0 being unclassified.

In an exemplary embodiment, classification 120 of the datasets may be conditional based on agreement of the host data 102 and the user data 116. For example, according to an exemplary embodiment, if a host report 102 is provided indicating that a program, process, or other data set or component thereof is classified in a particular category (benign, suspicious, or another category) and the user inputs 116 that are provided (or a majority or certain number of the user inputs 116 that are provided) agree with the host report 102, the two may be reconciled and the data set may be classified into the category indicated by both the host report 102 and the user inputs 116. However, in the event of a conflict or in the event of no clear agreement between the host report 102 and the user inputs 116, or in the event of conflict or no agreement between the host report 102 and a particular kind of user input such as community expert input 108, the data set may be grouped into the unclassified subset. (In certain exemplary embodiments, host reports 102 may also conflict with one another, for example if a program exhibits detrimental behavior on one machine due to certain hardware incompatibilities, certain other conflicting programs, because one machine is targeted by a malware program and another is not, or for any other reasons. In such exemplary embodiments, the host reports 102 may be similarly reconciled with one another; for example, a certain number of host reports 102 may be necessary or sufficient to flag a program as being suspicious, such as may be desired.)

In an exemplary embodiment, once the data subsets have been classified 120, they may be tendered to a system mainframe, which may perform one or more of several potential tasks in order to process the information. According to one exemplary embodiment, the may identify new programs and format them into a knowledge base 124, and the system may then be used to generate a comprehensive anti-malware knowledge base 124, may be used to generate prediction information 128, or may be used to refine the host programs in order to develop new detection, mitigation, and prediction protocols 126.

According to an exemplary embodiment, the structure of the system, including the structure of the knowledge base 124 and the structure of the host programs, may generally rely on three different elements.

The first foundational element of the system may be malware detection. The malware detection elements of the system, such as, for example, the anti-malware scanners of the host program, may be responsible for examining the data sets received by each host. According to an exemplary embodiment, each of these data sets may also be scanned by a system mainframe once the data sets have been recorded by the host 112 and received at the report database. In each case, in both the system mainframe and in the host programs, malware detection may be handled by a malware scanning agent (MSA), which may function similarly in the host program and the system mainframe, or which may have certain differences. (For example, according to an exemplary embodiment, the MSA of a mainframe computer may examine the logs generated by the MSAs of the host computers in order to ensure that the MSAs generated by the host computers have been completed in accordance with protocol and that the MSA programs have not been subverted by being instructed to improperly exclude a particular program or process.) While it may be redundant to re-scan files at the system mainframe after they have already been scanned by the host computer (and thus, according to an exemplary embodiment, there may be certain differences in the scan; a host computer may for example conduct a more thorough scan while the mainframe may operate to check the work of the host computer), re-scanning the files or reports that have been sent by the host computer or otherwise (such as in the form of user data) may eliminate certain vulnerability possibilities, such as may be created from users not running the most recent iteration of the host program.

According to an exemplary embodiment, an antimalware program may be continuously updated, at both the host level and the mainframe level, from its crowdsource 102, 116 as well as from other sources 110, such as, for example, external security researchers or websites hosting the data of the external security researchers, such as OPENMAL-WARE. As such, an antimalware program may be maintained at a high efficacy rate when processing suspicious datasets, with the primary difficulty experienced by the antimalware program coming from its inability to clearly categorize certain datasets as being clearly benign or clearly suspicious, which may be resolved by an expert evaluation of the data.

The second foundational element of the system may be its use of an expert evaluation scheme. According to an exemplary embodiment, an expert evaluation scheme may be included as a contingency for all of those datasets which cannot be accurately categorized by an antimalware program or which require greater reconciliation between the reports of one or more host computers 102 and the reports of one or more users 116. (According to an exemplary embodiment, since crowdsourcing provides massive quantities of data and since expert resources may be limited, an antimalware system may perform initial processing to determine how best to prioritize these expert resources. For example, according to an exemplary embodiment, datasets may be flagged for expert evaluation when they are uncategorized, or when there are significant numbers of datasets reporting a program as both benign and suspicious.) According to an exemplary embodiment, expert resources may be provided through internal experts (for example, company human resources), external researchers, other external experts, and experts in the community, in any combination such as may be desired.

(In an exemplary embodiment, definition of who is or is not an expert may be performed by the operator of a system based on their own defined criteria; for example, a community expert who may submit expert conclusions 108 may have to submit a number of correct reports or a given proportion of correct reports in a given timeframe in order to obtain or retain their expert status. It may also be understood that experts may have varying degrees of expertise and may be provided with more or less influence over a final determination because of that, such as may be desired. For example, in the event of a conflicting expert decision or determination as to the proper classification status of a program, in an exemplary embodiment a final determination may be made based on a majority expert decision, but in another exemplary embodiment a final determination may be influenced by the degree of expertise of each expert, such that, for example, more highly skilled experts are provided with votes having more weight.)

According to an exemplary embodiment, expert evaluation may be prioritized based on the most frequently unclassified objects received from users. In an exemplary embodiment, the system may provide a controlled environment for each expert to analyze and determine the nature of the unclassified object. For example, according to an exemplary embodiment, the system may provide a GUI through which an expert can interact with such a hosted environment, and may provide one or more heuristics which may facilitate the expert making a decision about the unclassified object.

According to an exemplary embodiment, expert evaluation may also be used for detailed evaluation of the reports of the hosts 102 or the users 116. While crowdsourcing generally is able to mitigate reliability concerns by sheer volume of data, it may be desired to review the actions of specific hosts or specific users if they are consistently producing erroneous results, or produce very erroneous results (for example, flagging a program as "benign" rather than "unclassified" when the consensus from other hosts and users is that the program should be classified as "suspicious"). Likewise, expert evaluation may be conducted on any new detection, mitigation, and prediction protocols 126 that may be developed by the system, in order to ensure that such detection, mitigation, and prediction protocols are sufficiently comprehensive and efficient and not likely to cause other problems; alternatively, according to an exemplary embodiment, expert evaluation may itself be the origin of one or more such protocols, or may be the source of suggestions as to new rules and application behaviors for detection, classification, and prediction, such as may be desired.

A third foundational element of the system may be the development of a deep learning element, which may be based on a knowledge base 124. According to an exemplary embodiment, a data collection system for an antimalware system 100 may have, as one output, the generation of or maintenance of a knowledge base 124, into which new objects may be placed once they are classified through a crowdsourcing and/or an expert evaluation process. In some exemplary embodiments, a knowledge base 124 may be configured to work with a signature-based detection process, and as such the knowledge base 124 may function as an up-to-date signature database derived from known threats, which may receive input from both security researchers and users. In such exemplary embodiments, viruses or other malware programs may be assigned a unique ID tag, which may enable an antivirus scanner program of a target host to examine received file content in order to determine whether or not an inspected file possesses malicious tags. In an exemplary embodiment, the provision of a knowledge base 124 configured to function with an SBD system may be designed to quickly check specific threats once they have been identified; once a virus is defined in the knowledge base 124, the threat signature of the virus (or other malware program) may be passed along to host computers, which may begin scanning for the threat signature of the virus based on the information contained in the updated knowledge base 124.

According to an exemplary embodiment, a knowledge base 124 may instead be configured to work with an anomaly-based detection process, or may additionally be configured to work with an anomaly-based detection process as well as an SBD process (which may operate alongside the ABD process, as desired). According to an exemplary embodiment, an ABD process may be used to dynamically inspect unknown files and scan source code execution in a controlled environment in order to detect the existence of expressed malicious behavior, and/or determine the probability that the unknown files or source code execution represent malicious behavior.

According to an exemplary embodiment, an ABD process may examine a number of factors in order to arrive at a determination that an unknown file or source code execution is or is not malicious, or does or does not have a high probability of being malicious. For example, according to an exemplary embodiment, one factor that may be examined may be the memory consumption of an unknown program, using a dynamic trace analysis or an execution trace analysis. Other factors that may be examined as part of a behavioral evaluation of a program may include, for example, analysis of Windows API or system calls, information flow analysis, or network messaging for the program. According to an exemplary embodiment, at least six types of model behavior may be examined by an ABD process, which may include, for example, file behavior, process behavior by the executed file, window behavior, network behavior, register behavior, and window service behavior. (For example, a malware program that rapidly creates full-screen windows on a compromised PC in order to show the user pop-up ads that obstruct their ability to access other programs on their machine may be classified as being malware by an ABD process based on this window behavior.)

According to an exemplary embodiment, a knowledge base 124 may instead be configured to work with a software behavior computation (SBC)-based detection process, or may additionally be configured to work with an SBC as well as ABD and/or SBD process (or any combination of the three such as may be desired). According to an exemplary embodiment, software behavior computation may operate based on the principle that programs are rules or implementations of mathematical functions or relationships; the recognition of this principle may enable automated behavior evaluation by laying the foundation for conversion from procedural logic to nonprocedural functional form, which may then be subject to evaluation. As such, SBC may generally operate to help eliminate certain forms of obfuscation in malware and derive the net behavior of the underlying code, based on a foundation of the Structure Theorem and the Correctness Theorem.

Such an examination of program behavior based on the deep functional semantics of the program may be achieved by examining source code by analyzing and computing all object behavior, both suspicious and benign. Suspicious behavior may then be flagged. One example inclusion that may tend to flag a program as being suspicious may be, for example, the use of "spaghetti code," overly complicated branched code that is intentionally unreadable to the point of being gibberish and which may thus tend to evade detailed analysis about its functions. Likewise, the use of an esoteric or obfuscatory language in the source code of the program may tend to flag it as being suspicious for similar reasons; for example, the use of the brainfuck language (symbols only), the Piet language (bitmap images as programs), or the Whitespace language (spaces, tabs, and return characters as the only valid characters, enabling such program code to typically be completely hidden or even embedded in text files next to valid-looking program code) may flag a program as suspicious or at least warranting further review. The system may also flag a program as suspicious based on the source code having particular commands; for example, numerous "write_file" commands may be suggestive of malicious behavior that, upon execution, may overwrite and destroy existing data, similar to several past security incidents. In other exemplary embodiments, the operators of an antimalware system or the users of a host program may also be able to define any other specific malicious behaviors, for example by defining a Behavior Specification Unit, which may apply to specific behaviors such as keylogging.

According to an exemplary embodiment, a knowledge base 124, once generated, may contain information regarding the execution behavior of a specific family of malware instances. For example, it may be understood that certain behavioral patterns may be exhibited by instances of the same malware instances, families, or classes, and these behavioral patterns may be logged and stored in the knowledge base 124 so that they can be scanned for by an ABD program.

According to an exemplary embodiment, a knowledge base 124 may be configured so that classifications of programs are periodically reevaluated, so that a program that is initially recognized as benign may be reevaluated and classified as malicious (for example, based on erratic behavior of the program on compromised systems, or the consistent presence of the program on compromised systems, or any other such criteria as may be desired) or so that a program that is initially recognized as malicious may be reevaluated and classified as benign (for example, if the program is intended to be benign but has certain compatibility issues with another program that result in system instability or other problems, the program may be classified as being malicious when it consistently results in system instability but may be classified as being benign once the compatibility issues are resolved). In an exemplary embodiment, the knowledge base may keep records of how recently a particular program has been recognized as being malicious or benign, may keep records of how recently the classification for a program was changed and what motivated the change, and so forth.

It may be understood that, in the computer security environment, the information asymmetries are such that the attacker is greatly favored over the defender; attackers decide whether to attack, how to attack, and what to attack, and can make all necessary preparations, all before the defender has any knowledge that the attack is coming. According to an exemplary embodiment, a knowledge base 124 may be created with the understanding in mind that developers of virus programs and malware may attempt to target the knowledge base 124 itself, and for example may seek to have a virus or malware program falsely whitelisted, may seek to have an important countermeasure program classified as being a virus or malware program, or may simply seek to reduce the apparent reliability of the knowledge base by getting unrelated programs falsely blacklisted or whitelisted. As such, according to an exemplary embodiment, a knowledge base 124 may store records covering how information regarding a particular program has been submitted and by whom. If an expert determines that a particular program has been falsely whitelisted or blacklisted, or if the reports from the vast majority of users of a host program (or from vetted users or other users who do not appear to be part of a botnet program) indicate that a program should be whitelisted or blacklisted when it is not, the status of the program may be changed, and the records of user submissions regarding the program may be analyzed to determine if the initial submissions were made by users who were in some way compromised. Such a configuration may enable many of the benefits of crowdsourcing without consequent drawbacks.

Such a knowledge base 124 may also be used to drive the deep learning element. According to an exemplary embodiment, once the knowledge base 124 has been generated and populated as previously described, the deep learning element may be applied to the knowledge base 124 in order to develop new detection, mitigation, and prediction protocols. The deep learning protocol of a system may be initially trained by supplying a list of known virus samples and benign files, which may be provided as part of the knowledge base 124 if desired or which may be hypothetical virus samples or benign files designed to illustrate particular characteristics of each. Over time, the deep learning protocol of the system may incorporate internal and external expert evaluation and inputs, and/or the results of other reports from the report database 118, such as may be desired, which may then be used to evolve the rules of the deep learning engine and develop new detection, mitigation, and prediction protocols 126. This information may then be added to the knowledge base 124, such as may be desired, and may be made available to an anti-malware program of the system and to one or more of the host computers (or may, in some exemplary embodiments, be implemented on the system without being implemented on the host computers or vice-versa).

In an exemplary embodiment, a deep learning engine may be continually retrained with updated data from reports 118 or from the knowledge base 124, which may result in a dynamic addition of new application behavior, detection, and prediction protocols to the knowledge base 124. For example, in some exemplary embodiments, a dynamic addition of a new protocol may deliberately be temporary, and the system may direct hosts to adopt the protocol only for a limited period of time; for example, a system that anticipates a specific type of attack to be directed at a particular type of system in a particular time may direct the host system to perform more intrusive scanning or prevention measures solely for that period of time. Other dynamic addition or revision of protocols may also be understood and may be implemented as desired.

In some exemplary embodiments, it may also be desirable for the deep learning element to develop one or more active or offensive elements of the system, which may be deployed where applicable and where desired. This may likewise be directed at predicted attackers, if desired. Such a system may be discussed in more detail with respect to exemplary FIG. 5.

According to some exemplary embodiments, once a knowledge base 124 has been established and the system has developed one or more prediction protocols 126, the system may collect and use data for the purpose of performing numerical malware prediction 128 based on those protocols. In an exemplary embodiment, malware prediction may operate based on principles similar to numerical weather prediction. According to an exemplary embodiment, numerical weather prediction (NWP) procedures may make use of mathematical models of the atmosphere and oceans in order to predict the weather based on current conditions. In particular, NWP procedures, which may be based on a combination of computer simulation and various input observations (which, in the case of NWP, may include, for example, various input observations from radiosondes and weather satellites) as applied to increasingly more complex models continues to yield increasingly realistic predictions. Related mathematical models may also be applied in order to produce long-term trend information, such as climate comprehension and long-term climate change projections. Such prediction may make use of some of the most powerful supercomputers available, and require the manipulation of immense datasets and the need to perform complex calculations quickly.

Such prediction may also generally be most accurate in the short to very short term, with long-term accuracy suffering based on the density and quality of observational inputs combined with forecast model deficiencies. In particular, the chaotic nature of the atmosphere (and the insolvability of partial differential equations that have been developed to try to characterize it) constrains the model such that even with a perfect model and flawless input data, chaos theory will still restrict NWP to 14 days after origination. This model must additionally be supplemented with parameterizations for solar radiation, moist processes (such as clouds and precipitation), heat exchange, soil, vegetation, surface water, and the effects of terrain.

However, despite such difficulties, NWP still generally manages to produce useful results with a reasonable amount of lead time. As such, the modeling of NWP can be generally analogized to the present task of predicting malware numerically based on application behavior 128. Analogies can likewise be made between the distributed information collection performed as part of NWP (specifically, the collection of atmospheric and oceanic data by making use of instruments such as weather satellites and radiosondes, collected by a variety of users including both professional and amateur meteorologists) and the distributed information collection that may be contemplated to be part of an anti-malware system 100.

According to an exemplary embodiment, a data collection system that may be part of an antimalware system 100 may incorporate several different factors into its prediction behavior 128. In an exemplary embodiment, a prediction process may be based, to some extent, on an evolutionary model of malware. It may be understood that there are generally four modalities that may result in evolution occurring, which may be identified as being genetic drift, gene flow, selection, and mutation. The prediction process may make use of one or more of these modalities, each of which may have its own mathematical and statistical models associated with it.

Genetic drift is a mechanism of evolution by which the allele frequencies in a population change over generations due to chance or sampling error rather than any specific benefit offered by the favoring of one allele over another. (Often, this can be the result of a population bottleneck which artificially reduces genetic variability by increasing inbreeding) "Genetic drift." as it applies to malware, may be a "luck factor" that causes certain types of malware to become unexpectedly disfavored or unexpectedly favored; for example, this may be because of a high-profile case in which a certain type of malware was unexpectedly very successful at causing a breach, or may be because of a high-profile legal case brought against the author of a certain type of malware. As such, in some exemplary embodiments, a prediction system may incorporate a "luck factor" in which a certain type of malware is favored or disfavored in a simulation for no particular reason in order to determine the likely effects of such malware being favored or disfavored above others.

Gene flow is a mechanism of evolution by which genetic variation is transferred from one population to another, generally by migration of individuals from one population to the other. It acts as a constraint on the speciation that may be created through population bottlenecking or other sources of genetic drift. "Gene flow," as it applies to malware, may cover introduction of new "genes" into specific populations rather than the population at large, as well as the introduction of new "genes." That is, a prediction system may look first at smaller populations of malware authors from the perspective that their ideas will spread—if a first type of attack is being perpetrated against financial institutions in Southeast Asia and a second type of attack is being perpetrated against retail companies in the United States, the prediction system may develop a prediction model for the future from the perspective that each group of attackers may learn from one another. The prediction system may also make predictions based on the anticipated introduction of new malware into the population as a whole, for example malware that has been conceptualized by security researchers but not yet seen in the wild.

Selection, both natural and artificial, is a mechanism by which particular genetic characteristics may be favored over others, leading to increases in their preponderance through inheritance. Selection is essentially the "engine" through which adaptive evolution functions. As it applies to malware, "natural selection" may cover non-targeted selective pressures or selective pressures not targeted at the malware itself, while "artificial selection" may cover selective pressures targeted at a specific malware program or family of malware. An example of a "natural selection" pressure may be, for example, an increase in value of a cryptocurrency that has been popular among ransomware authors for its untraceability; this may motivate more ransomware attacks, as more malware authors view the potential payoff of such an attack to outweigh the potential downsides. An example of an "artificial selection" pressure may be, for example, new legislation increasing the criminal penalty for perpetrating a malware attack against targets like hospitals. The prediction system may make predictions based on current and anticipated natural and artificial selection pressures.

Finally, mutation is a mechanism by which the nucleotide sequence of the genome of an organism, virus, or other genetic element may be permanently altered. Mutations can range in size and in significance, and can affect anything from a single DNA base pair to a large segment of a chromosome. As it applies to malware, "mutation" may include various forms of variation in programs, such as the appearance of variations in a particular malware family or the introduction of polymorphism to a particular type of malware. The prediction system may make predictions of malware behavior based on anticipated future variations in malware, which may, for example, be relevant to the ability of signature-based detection systems, which may be evaded with variation, to detect the malware.

The prediction system may also make predictions based on observed or anticipated developments in antimalware programs. For example, according to an exemplary embodiment, the prediction system may take into account a percent probability of failure of each antimalware program on the market, and anticipate the further spread of each antimalware program. (In some exemplary embodiments, the growth in antimalware programs may be considered as a selection pressure on malware and the growth in particular types of malware may be considered as a selection pressure on antimalware programs, allowing the varying populations of each to be modeled with that in mind.)

In some exemplary embodiments, the prediction system (or other elements of an antimalware system) may be combined with a real-time feedback system, which may allow, for example, the revision of predictions or protocols in real time. According to some exemplary embodiments, an antimalware system may be compared, in some respects, to the WAZE traffic application. WAZE is a GPS-based geographical navigation application program. It works on smartphones and tablets with GPS support, providing turn-by-turn information and user submitted travel times and route details while downloading location-dependent information. WAZE differs from traditional GPS navigation software by being community-driven, aggregating complementary map data and real-time traffic information from its users. For example, a user of the WAZE application may report a traffic accident as it occurs, or may report a red light camera as it is spotted, allowing other users to take each into consideration and allowing the application to revise its travel estimates based on the traffic obstruction. Likewise, user reports 116 may be combined with an already-extant prediction model, such that, as the user reports 116 come in, the prediction model may be revised to accommodate the actual observed threats instead of or in addition to the anticipated ones.

Figure 2:
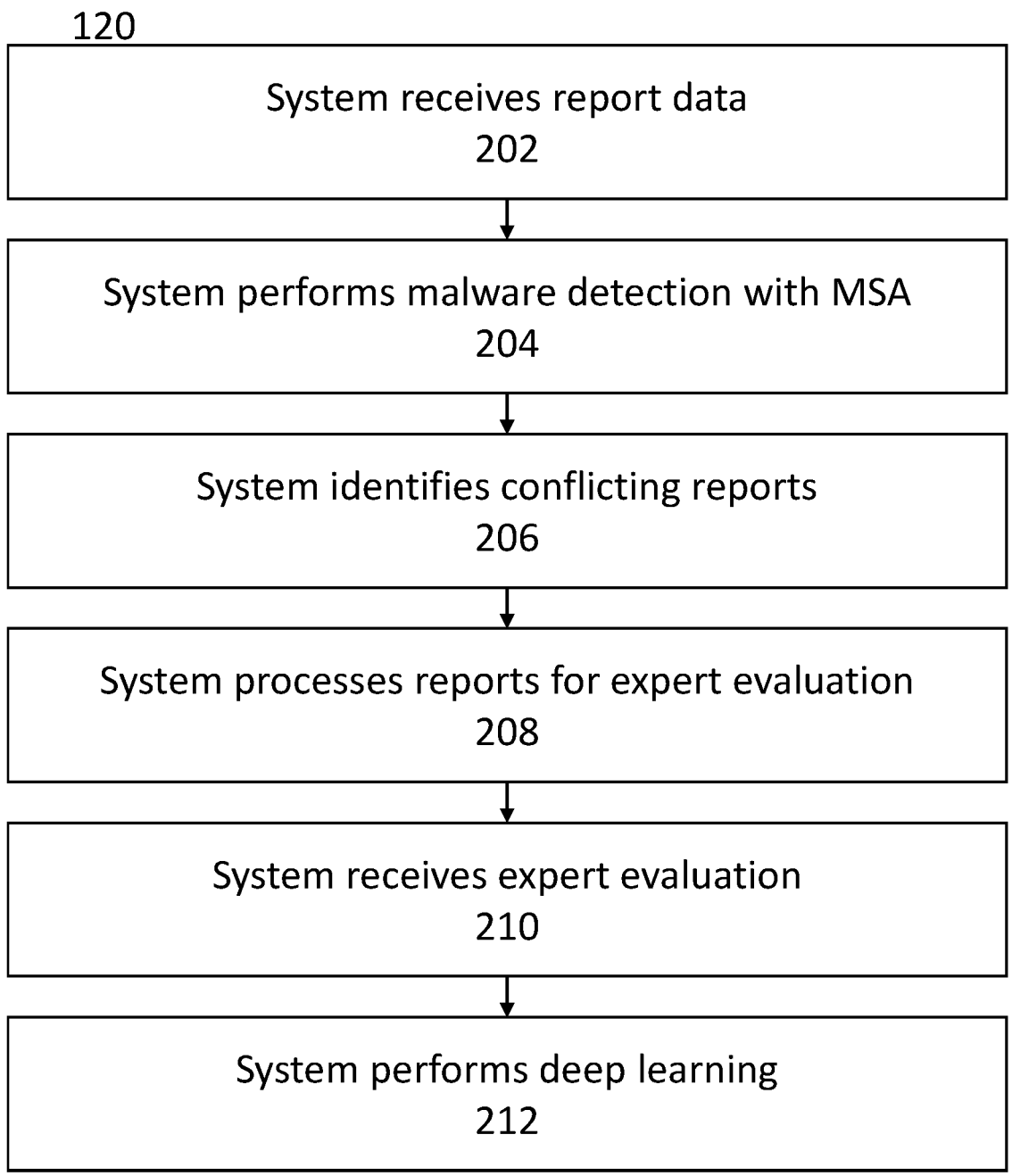
FIG. 2 is an exemplary flowchart depicting an exemplary embodiment of a process for performing data classification using an antimalware system.

Turning now to exemplary FIG. 2, FIG. 2 shows an exemplary classification process 120 in more detail. According to an exemplary embodiment, once the system has received report data 202, it may perform malware detection with a malware scanning agent 204, in order to ensure that the vulnerability possibility of insufficiently protective or compromised host systems is protected against. Once this has been completed, the system may analyze the reports provided by the hosts and users and may identify which are in conflict with one another 206. This may be used in order to classify one or more of the data sets as "uncategorized" and in need in expert evaluation. The system may process the reports for evaluation by one or more experts 208 (which may be internal professional experts, external professional experts, community experts, or even expert systems such as may be desired). Once the expert evaluation has been received 210, this information may be provided to a knowledge base, at which point it may be the basis of deep learning performed by the system 212 in order to improve system protocols.

Figure 3:
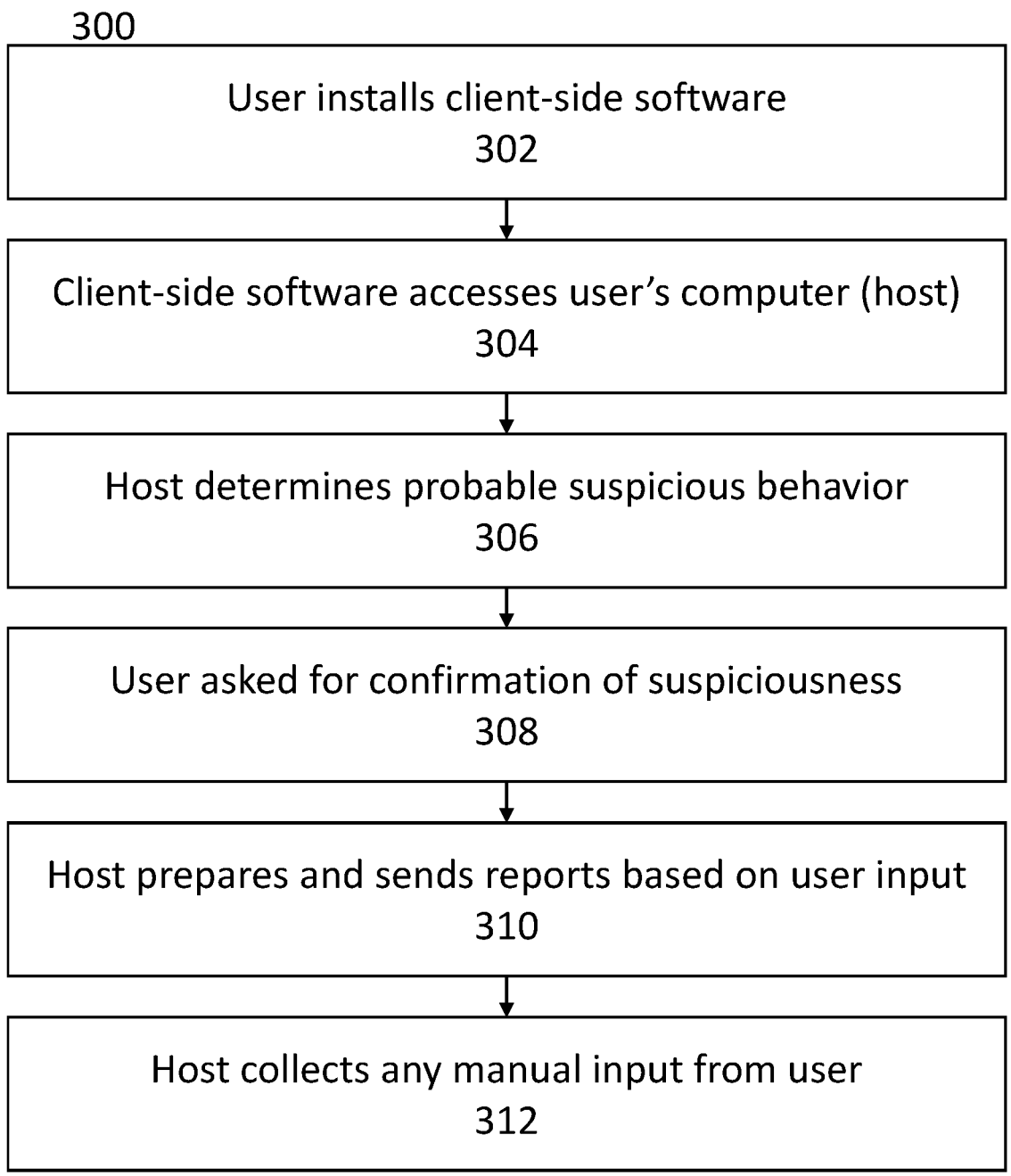
FIG. 3 is an exemplary flowchart depicting an exemplary embodiment of a process for preparing a host report to be delivered to an antimalware system.

Turning now to exemplary FIG. 3, FIG. 3 shows an exemplary host installation process 300, by which a user may install a host program on their system. The user may first install 302 client-side software to install the host program on their machine. Once this has been done, the client-side software may access the user's computer 304, and may determine any initial probable suspicious behavior 306. Once the host program has identified any probable suspicious behavior 306, the user may be asked for confirmation that the identified activity has been properly flagged as suspicious 308, at which point the user may unflag certain activity or may flag certain activity that had not been flagged by the program, such as may be desired. Once the user has offered their input, the host may prepare and send the report based on the user's input 310, and may send any other manual input from the user 312.

Figure 4:
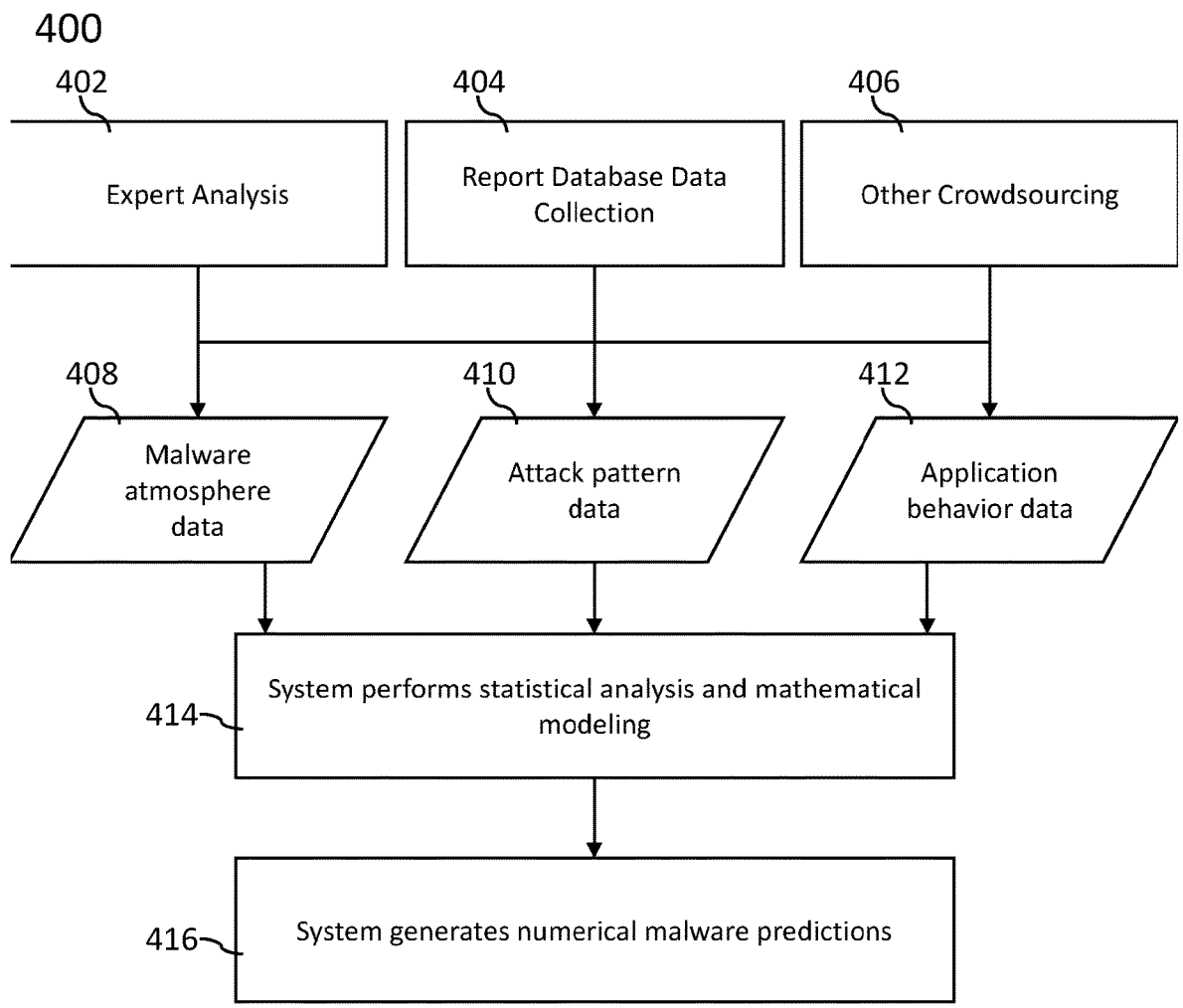
FIG. 4 is an exemplary embodiment of a prediction system for an antimalware system.

Turning now to exemplary FIG. 4, FIG. 4 shows an exemplary embodiment of a prediction system for an anti-malware system 400. In an exemplary embodiment, a prediction system 400 may draw from expert analysis 402, report data 404, and other crowdsourcing information 406, and may use this to generate malware atmosphere data 408, attack pattern data 410, and application behavior data 412. This may then be used as the basis for performing statistical analysis and mathematical modeling 414, which in turn may be used to generate numerical malware predictions 416.

Figure 5:
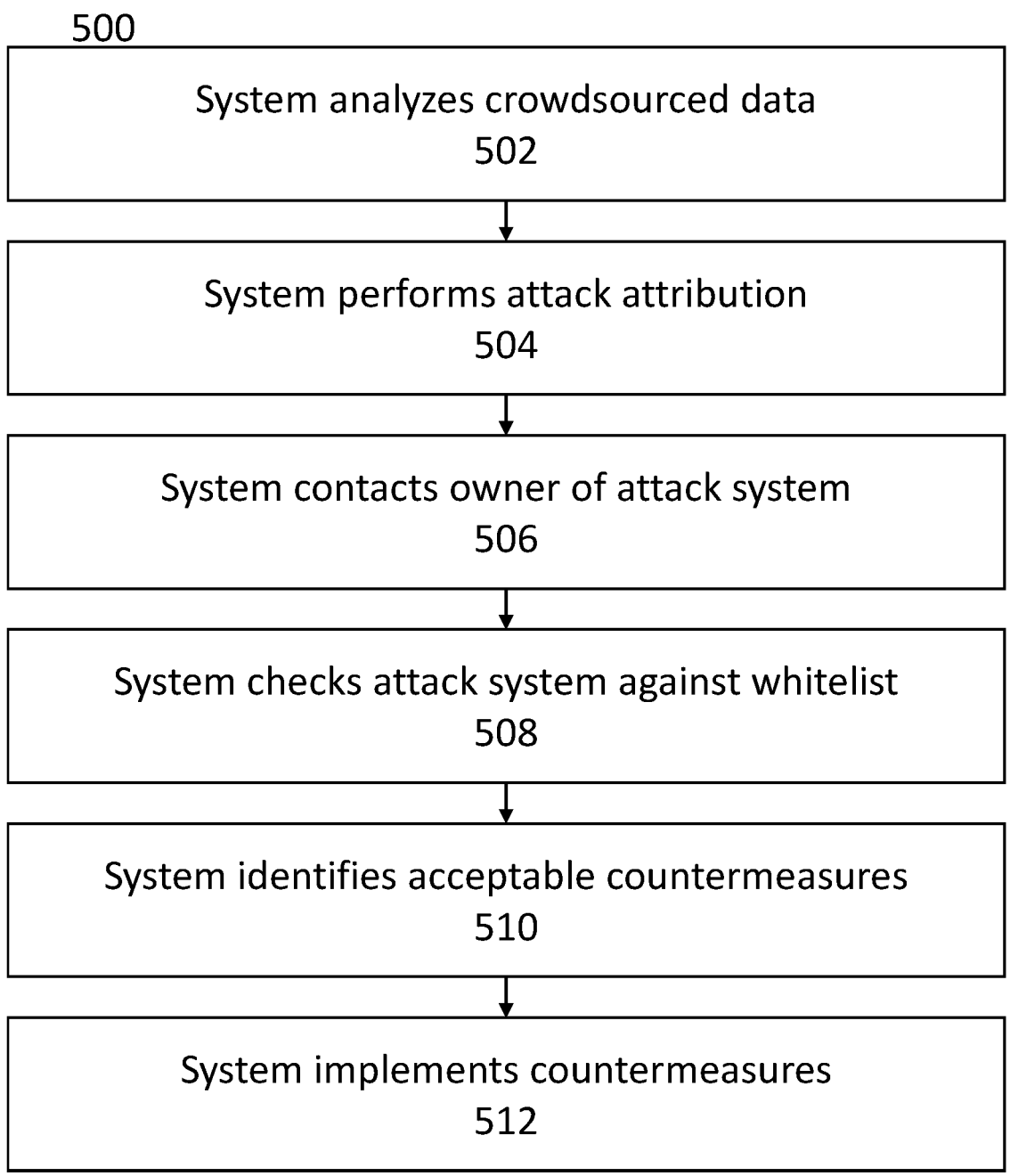
FIG. 5 is an exemplary flowchart depicting an exemplary embodiment of a process for performing one or more countermeasures using an antimalware system.

Turning now to exemplary FIG. 5, FIG. 5 shows an exemplary flowchart depicting an exemplary embodiment of a process for performing one or more countermeasures using an antimalware system 500. According to an exemplary embodiment, it may be desired for an antimalware system to be able to perform "hack-back" attacks under certain circumstances, such as when an attacker originates from a location in which a central authority cannot be relied upon to stop the attacker, or when the attacker is the central authority (such as may be the case with certain rogue states). As such, in some exemplary embodiments, an antimalware system may be capable of performing, for example, a DDoS attack (using the resources of host computers) in order to slow down or stop attackers, or otherwise perform certain botnet-like functions.

It may be understood that, traditionally, a DDoS attack is a type of denial of service attack whereby multiple compromised systems—often infected by a Trojan to configure the compromised systems into a botnet—are used to target a single system causing a denial of service. A botnet is a network of private computers infected with malicious software and controlled as a group unbeknownst to their owners. An antimalware service, by contrast, may be configured to perform similar denials of service, where helpful to stop an attacker, but with the full acknowledgement and permission of the host owners. (An antimalware service may also be configured to perform any other attacks such as may be desired, with many of the same considerations coming into play.)

In order to perform such an attack, a system may first start with analyzing the crowdsourced data that it has compiled 502. In certain embodiments, the system may obtain data from law enforcement sources or other sources that may have specific insight into the location of an attacker, while in other exemplary embodiments the antimalware system may make use of machine learning techniques as applied to any available information (including, for example, e-mail or social media information, electronic transaction data, GPS data, phone call data including landline, VOIP, or mobile communications, video communications or other footage, or any other electronic information such as may be desired) in order to better determine the identity, source, intentions, and potential damage that can be inflicted by a particular attacker.

Once the system has performed an attack attribution 504, the system may be configured to contact an owner of the attack system 506. It may be understood that one of the major potential pitfalls for "hackbacks" is the potential for unintended consequences, particularly if an attacker is routing their attack through some other vulnerable system (particularly a system that has the potential to cause significant harm if taken offline, such as the network of a hospital). In this event, when a system may be operating as a "cutout" to shield the actual identity and location of the attackers without the permission of its owner, the attack may be best mitigated by contacting the owner.

If this is not possible, or if this is deemed unlikely to work (for example, if the owner is unambiguously the attacker) the system may check the system against a whitelist of systems not to perform a "hack-back" attack against 508. (For example, certain systems may be deliberately excluded because of the possibility of creating an international incident. Other systems, such as the aforementioned hospital systems, may also be whitelisted as not to be taken offline even in the event of a severe data breach or malware incident.)

Once the system has determined that an attack may be performed, or that other countermeasures may be implemented, the system may identify what countermeasures are acceptable and may be implemented 510. The system may then implement those countermeasures 512.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for malware prediction and suppression, comprising:
   a plurality of host computers, each of the plurality of host computers comprising a host antimalware service configured to collect log data, each of the plurality of host computers further comprising a manual reporting interface provided by the antimalware service; and
   a server, the server comprising a report database and a knowledge base;
   wherein the server is configured to perform the steps of:
   receiving, from the plurality of host computers, log data and manual submission data relating to a program;
   classifying, based on the log data and manual submission data, the program;
   identifying whether the program is new, and, when the program is new, format the program for inclusion into the knowledge base;
   identifying an application behavior exhibited by the program, and performing a numerical malware prediction based on the application behavior, wherein the numerical malware prediction retrieves one or more of expert analysis data, report data, and crowdsourced information to generate malware atmosphere data, attack pattern data, and application behavior data;
   retrieving the malware atmosphere data and the attack pattern data, and generating the numerical malware prediction based on the application behavior, the malware atmosphere data, and the attack pattern data;
   predicting the application is malware based on results of the numerical malware prediction;
   identifying, with a whitelist, an absence of a source of the application; and
   executing a Direct Denial of Service (DDoS) attack on the source of the application with the plurality of host computers.

2. The system of claim 1, wherein the step of receiving, from the plurality of host computers, log data and manual submission data relating to a program comprises:
   accessing, with the host antimalware service, the host computer, and determining one or more instances of probable suspicious behavior;
   generating a confirmation message indicating the suspicious behavior, displaying the confirmation message via the manual reporting interface, and receiving a confirmation from a user via the manual reporting interface; and
   generating and sending a report to the server comprising log data of the suspicious behavior.

3. The system of claim 1, wherein the step of classifying the program comprises:
   identifying a plurality of reports received from the host computers, each of the reports comprising at least one of log data and manual submission data;
   identifying a conflict in the plurality of reports; and
   flagging the program for expert evaluation based on the conflict.

4. The system of claim 3, wherein the system is further configured to perform the steps of:
   receiving an expert evaluation indicating the program as malicious or non-malicious, and uploading the expert evaluation to the knowledge base;

identifying one or more reports in the plurality of reports contradicting the expert evaluation, and identifying a source of the one or more reports; and flagging the source of the one or more reports.

5. The system of claim 4, wherein the system is further configured to perform the steps of:

identifying a source that has been flagged a plurality of times; and classifying further reports from the source as untrusted.

6. The system of claim 1, wherein the server further comprises a deep learning element, and wherein the knowledge base further comprises a list of known virus samples and known benign files, wherein the server is configured to perform the steps of:

automatically generating at least one rule based on the list of known virus samples and known benign files; and automatically updating the at least one rule based on the log data and manual submission data.

7. The system of claim 1, wherein the log data and manual submission data further comprises the program, and wherein the server further comprises a server antimalware service configured to scan the log data and manual submission data.

8. The system of claim 6, wherein the deep learning element and knowledge base are further configured to work with a software behavior computation (SBC)-based detection process to perform analysis comprising:

examining source code by analyzing and computing suspicious object behavior and benign object behavior;

eliminating obfuscation in malware and deriving net behavior of underlying code, based on a foundation of the Structure Theorem and Correctness Theorem; and flagging suspicious behavior.

9. A method for malware prediction and suppression, comprising:

installing, on a plurality of host computers, a host antimalware service configured to collect log data, and further comprising a manual reporting interface provided by the antimalware service; and performing, on a server comprising a report database and a knowledge base, the steps of:

receiving, from the plurality of host computers, log data and manual submission data relating to a program;

classifying, based on the log data and manual submission data, the program;

identifying whether the program is new, and, when the program is new, formatting the program for inclusion into the knowledge base;

identifying an application behavior exhibited by the program, and performing a numerical malware prediction based on the application behavior, wherein the prediction system retrieves expert analysis data, report data, and crowdsourced information to generate malware atmosphere data, attack pattern data, and application behavior data; retrieving malware atmosphere data, retrieving attack pattern data, and generating the numerical malware prediction based on the application behavior, the malware atmosphere data, and the attack pattern data;

predicting the application is malware based on results of the numerical malware prediction;

identifying, with a whitelist, an absence of a source of the application; and executing a Direct Denial of Service (DDoS) attack on the source of the application with the plurality of host computers.

10. The method of claim 9, wherein the step of receiving, from the plurality of host computers, log data and manual submission data relating to a program comprises:

accessing, with the host antimalware service, the host computer, and determining one or more instances of probable suspicious behavior;

generating a confirmation message indicating the suspicious behavior, displaying the confirmation message via the manual reporting interface, and receiving a confirmation from a user via the manual reporting interface; and generating and sending a report to the server comprising log data of the suspicious behavior.

11. The method of claim 9, wherein the step of classifying the program comprises:

identifying a plurality of reports received from the host computers, each of the reports comprising at least one of log data and manual submission data;

identifying a conflict in the plurality of reports; and flagging the program for expert evaluation based on the conflict.

12. The method of claim 11, further comprising performing the steps of:

receiving an expert evaluation indicating the program as malicious or non-malicious, and uploading the expert evaluation to the knowledge base;

identifying one or more reports in the plurality of reports contradicting the expert evaluation, and identifying a source of the one or more reports; and flagging the source of the one or more reports.

13. The method of claim 12, further comprising performing the steps of:

identifying a source that has been flagged a plurality of times; and classifying further reports from the source as untrusted.

14. The method of claim 9, wherein the server further comprises a deep learning element, and wherein the knowledge base further comprises a list of known virus samples and known benign files, and further comprising performing the steps of:

automatically generating at least one rule based on the list of known virus samples and known benign files; and automatically updating the at least one rule based on the log data and manual submission data.

15. The method of claim 9, wherein the log data and manual submission data further comprises the program, and wherein the server further comprises a server antimalware service configured to scan the log data and manual submission data.

* * * * *